United States Patent
Kalavsky (10) Patent No.: US 9,702,370 B2
(45) Date of Patent: Jul. 11, 2017

(54) AXIAL BEARING FOR AN ELECTRIC DRIVE

(75) Inventor: Michal Kalavsky, Kosice (SK)

(73) Assignee: BSH Hausgeraete GmbH, Munich (DE)

( * ) Notice: Subject to any disclaimer, the term of this patent is extended or adjusted under 35 U.S.C. 154(b) by 485 days.

(21) Appl. No.: 14/115,383

(22) PCT Filed: May 2, 2012

(86) PCT No.: PCT/EP2012/057992
§ 371 (c)(1),
(2), (4) Date: Nov. 4, 2013

(87) PCT Pub. No.: WO2012/150242
PCT Pub. Date: Nov. 8, 2012

(65) Prior Publication Data
US 2014/0072459 A1 Mar. 13, 2014

(30) Foreign Application Priority Data

May 4, 2011 (DE) .................. 10 2011 075 227

(51) Int. Cl.
*F04D 29/051* (2006.01)
*F04D 29/041* (2006.01)
(Continued)

(52) U.S. Cl.
CPC ........... *F04D 29/051* (2013.01); *F04D 13/06* (2013.01); *F04D 29/0413* (2013.01);
(Continued)

(58) Field of Classification Search
CPC ...... F04D 29/051; F04D 13/06; F04D 29/057; F04D 29/0513; F16C 17/04; F16C 35/02;
(Continued)

(56) References Cited

U.S. PATENT DOCUMENTS 327,188 A * 9/1885 Sabat ....................... D03C 3/24
139/331
3,586,358 A * 6/1971 Kiesow ................. F16C 23/045
403/122

(Continued)

FOREIGN PATENT DOCUMENTS

| CN | 1424515 A | 6/2003 |
| CN | 101248283 A | 8/2008 |

(Continued)

OTHER PUBLICATIONS

Google Translation of Lahuson https://patents.google.com/patent/EP0806579A2/en Lahusen, DE, Published Nov. 12, 1997.*
(Continued)

*Primary Examiner* — Devon Kramer
*Assistant Examiner* — Kenneth J Hansen
(74) *Attorney, Agent, or Firm* — Laurence A. Greenberg; Werner H. Stemer; Ralph E. Locher (57) ABSTRACT

An electric drive for a domestic appliance includes a rotor and a shaft. An axial bearing retains the rotor on the shaft. The axial bearing has an axle hole, a multi-sided outer contour and an end face having a recess running centrally through the axle hole. The rotor includes a bearing seat that has a multi-sided inner contour corresponding to the multi-sided outer contour. The bearing seat has lateral notches. The recess ends at opposite ones of the lateral notches on opposite sides of the end face.

5 Claims, 5 Drawing Sheets

(51) Int. Cl.
  *H02K 5/167* (2006.01)
  *H02K 7/08* (2006.01)
  *F04D 13/06* (2006.01)
  *F16C 17/04* (2006.01)

(52) U.S. Cl.
  CPC ............ *F16C 17/04* (2013.01); *H02K 5/1672* (2013.01); *H02K 7/08* (2013.01); *H02K 7/083* (2013.01); *H02K 2205/03* (2013.01)

(58) Field of Classification Search
  CPC .......... F16C 17/045; H02K 7/08; H02K 5/16; H02K 5/1672; H02K 5/1675; H02K 5/1732
  See application file for complete search history.

(56) References Cited

U.S. PATENT DOCUMENTS

| | | | | |
|---|---|---|---|---|
| 4,358,168 A | * | 11/1982 | Kallin | ...................... F16C 17/04 384/193 |
| 6,309,188 B1 | * | 10/2001 | Danner | ............... F04D 29/0413 310/87 |
| 6,880,231 B2 | | 4/2005 | Campbell et al. | |
| 6,939,115 B2 | * | 9/2005 | Knoll | ................... F04D 13/0633 417/423.12 |
| 7,819,640 B2 | * | 10/2010 | Kalavsky | .............. F04D 29/426 417/369 |
| 8,383,239 B2 | | 2/2013 | Horton et al. | |
| 2002/0196988 A1 | * | 12/2002 | Tsui | ........................ F04D 13/08 384/121 |
| 2005/0046292 A1 | | 3/2005 | Campbell et al. | |

FOREIGN PATENT DOCUMENTS

| | | | |
|---|---|---|---|
| DE | 1987223 U | 6/1968 | |
| DE | 195 48 471 | 6/1997 | |
| DE | EP 0806579 A2 | * 11/1997 | .......... F04D 29/0413 |
| EP | 0 065 585 | 12/1982 | |
| EP | 0806579 A2 | 11/1997 | |
| JP | H11309539 A | 11/1999 | |

OTHER PUBLICATIONS

International Search Report for PCT/EP2012/057992, mailed Jun. 3, 2013.
German Search Report for corresponding German Application No. 10 2011 075 227.7, dated Apr. 17, 2012, 6 pages.

\* cited by examiner

AXIAL BEARING FOR AN ELECTRIC DRIVE

This application is the U.S. national phase of International Application No. PCT/EP2012/057992 filed 2 May 2012 which designated the U.S. and claims priority to DE Patent Application No. 10 2011 075 227.7 filed 4 May 2011, the entire contents of each of which are hereby incorporated by reference.

The invention relates to an axial bearing for retaining a rotor on a shaft of an electric drive, in particular for a domestic appliance.

With conventional electric drives, a shaft is usually provided, upon which a rotor of the drive is fixed. In drives which are exposed to forces which usually occur in domestic appliances, provision may however also be made for retaining the rotor on the shaft by way of an axial bearing, which shaft secures the rotor against axial forces during operation. In a conventional electric drive of this type such an axial bearing comprises a cylindrical outer contour, wherein a diameter of the axial bearing is selected such that it can be suitably accommodated on the rotor body by a rubber bush.

With a bearing arrangement of the axial bearing, it should be ensured that adequate friction is achieved between the axial bearing and the bearing seat on the rotor so as to prevent slippage between the said parts and thus damage thereto. To this end the surface of the outer contour of the axial bearing is usually ground. This increases manufacturing costs however.

The object of the invention is therefore to specify an improved bearing concept for an electric drive, in particular for a domestic appliance.

A domestic appliance is understood to mean a device which is used for homemaking purposes. This may be a large domestic appliance such as for instance a washing machine, a tumble dryer, a dishwasher, a cooking device, an extractor hood or a refrigeration device. This may however also be a small domestic appliance, such as for instance an automatic coffee maker, a food processor or a vacuum cleaner.

The object is achieved by the features of the independent claims. Advantageous developments form the subject matter of the dependent claims.

According to the invention, an axial bearing for retaining a rotor on a shaft of an electric drive, in particular for household appliances, has a multi-sided outer contour. For instance, the multi-sided outer contour takes the form of a hexagon, in particular a regular hexagon. The axial bearing can be easily accommodated in a bearing seat or a receptacle on the rotor of the drive through the outer contour of the axial bearing. An accurately-fitting assembly is thus enabled. Furthermore, no rubber bush is required around the outer contour of the axial bearing. Accordingly, a separate work step can be saved when assembling an arrangement comprising rotor and axial bearing.

The axial bearing includes for instance a ceramic material or is produced from the ceramic material.

In particular, the axial bearing has a first end face, a second end face and the multi-sided outer contour, wherein the first and the second end face are opposite one another. Furthermore, the axial bearing includes an axle hole, which runs centrally through the first and/or the second end face for instance.

According to an embodiment, the first end face of the axial bearing comprises at least one planar segment. The first end face can thus form a planar surface of the axial bearing.

According to a further embodiment, the first end face of the axial bearing comprises a recess, which runs centrally through the center bore of the axial bearing. Fluid for lubricating the axle can be guided in the recess which is embodied for instance as a notch in a planar surface. With one possible use of the axial bearing in a pump drive, the fluid is water pumped by the pump for instance.

According to a further embodiment, the second end face of the axial bearing comprises a curved segment. This enables a tilting movement of the axial bearing along the curvature to be made possible.

According to a further embodiment, the axle hole of the axial bearing comprises a segment which tapers at least partly. For instance, the axle hole runs cylindrically in a first segment with the same and/or approximately the same diameter and conically in a second segment, so that the diameter of the axle hole changes continuously for instance.

According to a further embodiment, the axle hole of the axial bearing comprises a smaller inner diameter on the first end face of the axial bearing than on the second end face. For instance, the axle hole extends in a conical segment from a smaller inner diameter inside the axial bearing to a larger inner diameter on the second end face of the axial bearing. Movement and/or play of the axial bearing can herewith be permitted on the shaft.

According to a further aspect, the invention relates to an electric drive, in particular for a domestic appliance, having an axial bearing according to one of the described embodiments for retaining a rotor of the electric drive on a shaft of the electric drive. The electric drive is embodied for instance as a pump drive in a pump.

According to an embodiment, the rotor of the electric drive includes a bearing seat, which has a multi-sided inner contour which corresponds to the multi-sided outer contour of the axial bearing. An accurately fitting accommodation of the axial bearing on the rotor is herewith assisted. For instance, the bearing seat herewith comprises lateral notches. In particular, the bearing seat is embodied in the form of individual segments which are arranged annularly with a distance between two adjacent segments respectively. Less material is herewith needed for the bearing seat on the rotor, while an accurately seating of the axial bearing can be retained in the bearing seat. The bearing seat also comprises for instance an outer contour in the form of a circle. The bearing seat is accordingly externally round and internally angular in accordance with the multi-sided outer contour of the axial bearing.

According to a further embodiment, the base area of the bearing seat comprises a curved segment. This enables a movement of the axial bearing in the bearing seat. For instance, the base area of the bearing seat and the second end face of the axial bearing have a curvature which corresponds to the other curvature respectively. This enables the axial bearing to slide in the curved base area of the bearing seat, in particular laterally. In order to assist with such a movement of the axial bearing in the bearing seat, the axial bearing is arranged for instance with play in the bearing seat.

According to a further embodiment, the axial bearing is fastened with play to the shaft or an axle of the drive. For instance, an inner diameter, in particular the smallest inner diameter of the axle hole of the axial bearing, is somewhat larger than the corresponding outer diameter of the shaft and/or axle, which runs at this point through the axle hole. This enables unavoidable manufacturing inaccuracies of the drive to be compensated for, as a result of which premature wear of bearings, for instance radial bearings of the drive, can be prevented.

According to a further aspect, the invention relates to a domestic appliance, in particular a mixer, a food processor, a shredder, a grinder or suchlike, with an electric drive according to one of the afore-cited embodiments.

According to a further aspect, the invention relates to a pump, in particular for a water-conducting domestic appliance, having a pump drive, which includes an electric drive according to one of the described embodiments.

According to an embodiment, the rotor or a shaft of the drive in the pump comprises a fan. The pump drive is for instance an electronically commutated wet-running motor. The pump drive can be integrated in the pump.

The pump is preferably suited to water-conducting domestic appliances. Water-conducting domestic appliances are for instance dishwashers, washing machines, tumble dryers or automatic coffee makers.

According to further aspects, the invention relates to a water-conducting domestic appliance with a pump according to one of the afore-described embodiments.

Further exemplary embodiments are explained with reference to the appended drawings in which.

Figure 1:
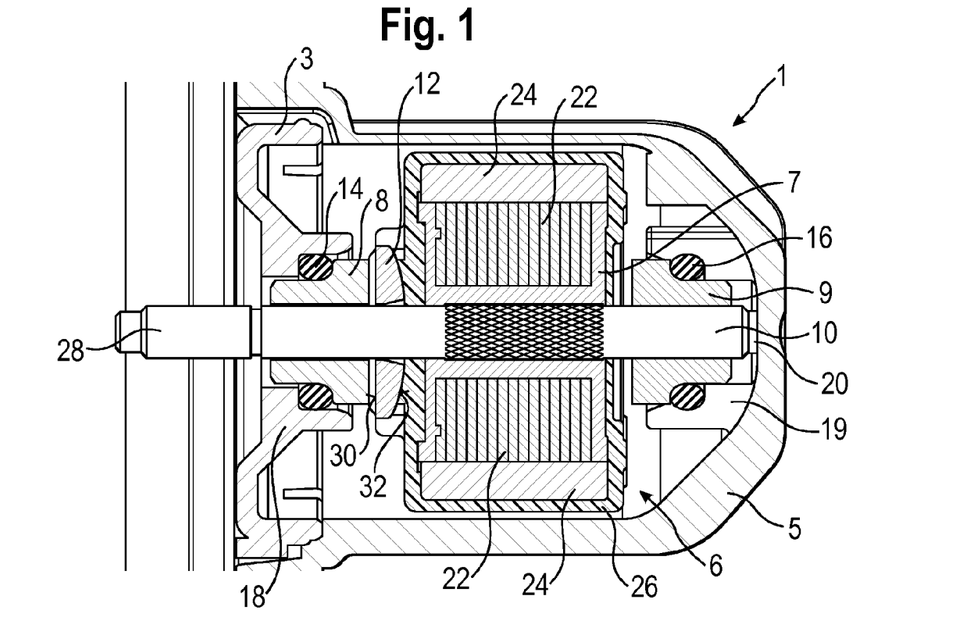
FIG. 1 shows an embodiment of a pump with pump drive.

FIG. 1 shows by way of example an embodiment of a pump 1 with an electric drive 6, which is used as a pump drive. The drive 6 is embodied for instance as an electronically commutated wet-running motor, in which a rotor housing is provided between rotor 7 and stator (not shown). This rotor housing is composed of a front housing shell 3 and a pot-shaped shield 5, which are both connected to one another in a form-fit manner. The rotor 7 of the electric drive 6 is arranged inside the rotor housing. A shaft 10 of the electric drive 6 is rotatably mounted by a front sliding bearing 8 facing the housing shell 3 and by a rear sliding bearing 9 facing the plate 5. The rotor 7 is retained on the shaft 10 in a torque proof manner. An axial bearing 12 is provided to retain the rotor 7 on the shaft 10 so as to compensate for axial forces during operation of the pump 1.

An O-ring 14, which consists of rubber for instance, is arranged between the front sliding bearing 8 and the housing shell 3. An O-ring 16 is likewise also provided on the rear sliding bearing 9. The sliding bearings 8, 9 with the O-rings 14, 16 are arranged in a front and/or rear sliding bearing seat 18, 19. The end of the shaft 10 facing the pot-shaped shield 5 is arranged at a distance 20 from the shield 5 so that an axial movement of the shaft 10 is possible without damage. It is also possible to provide an elastic damping element, for instance in the form of a rubber element, between this end of the shaft 10 and the plate 5, in order to absorb axial movements of the shaft 10.

The rotor 7 includes a laminated rotor core 22 for instance which supports permanent magnets 24. The rotor core 22 and the permanent magnets 24 are enclosed in a fluid-tight fashion by a casing 26 made of plastic material. A fan is fastened in a torque proof manner outside of the rotor housing to a front end of the shaft 10 as a fan seat 28, which is not shown for the sake of clarity.

The axial bearing 12 has a first end face 30 and a second end face 32. The first end face 30, which faces away from the rotor 7, has at least planar segments or is entirely or for the large part planar. The second end face 32, which faces the rotor 7 and/or is in contact with the rotor 7, has a curvature or at least curved segments. The rotor 7 has a receptacle for the axial bearing 12 in the form of a bearing seat 40. This bearing seat 40 can be manufactured in one piece with the casing 26 of the rotor 7 made of plastic material. The bearing seat 40, in which the axial bearing 12 is accommodated, is molded in accordance with the curvature of the second end face 32, so that a complete or an at least approximately complete form-fit is produced between the axial bearing 12 and the rotor 7.

Figure 2:
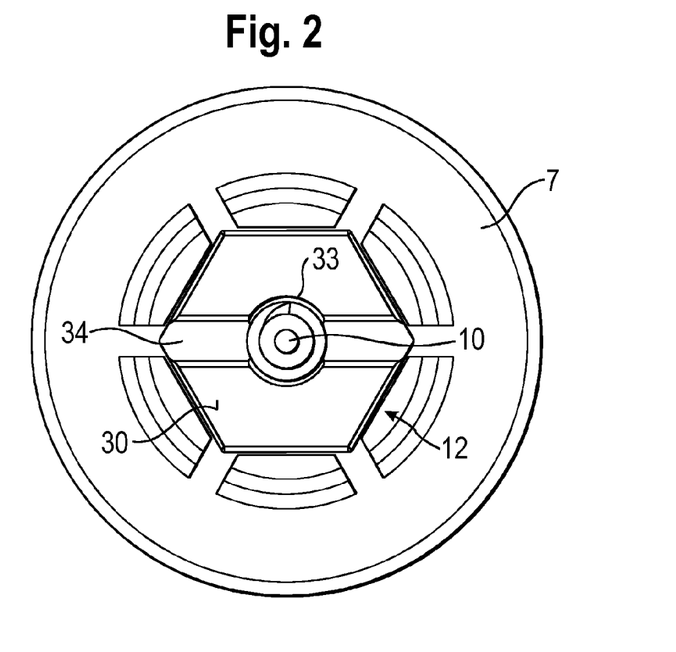
FIG. 2 shows a top view in the axial direction onto the rotor of the pump according to FIG. 1 with an axial bearing, FIG. 3, 4, 5 show different views of the axial bearing according to FIG. 2.

FIG. 2 shows a top view of the rotor 7 along the shaft 10. The axial bearing 12 is fastened to the shaft 10 and to the rotor 7, said axial bearing comprising a multi-sided outer contour, which in the present case takes the form of a regular hexagon. In the arrangement shown, the first end face 30 of the axial bearing 12 is visible, which has a first and a second planar segment above and/or below a recess 34. The recess 34 runs centrally through the axial bearing 12 past an axle hole 33 and is embodied for instance as a notch, groove or a round channel. Firm seating in the rotor 7 can be easily achieved by the multi-sided embodiment of the axial bearing 12.

Figure 3:
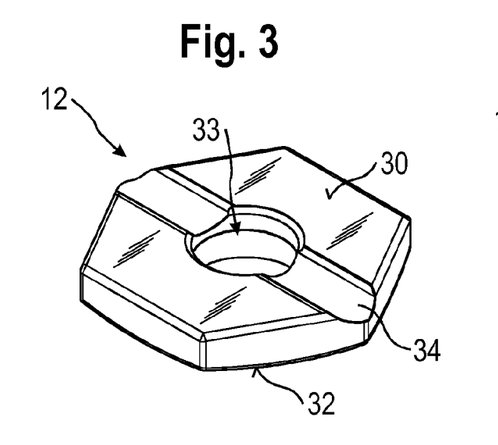
Figure 4:
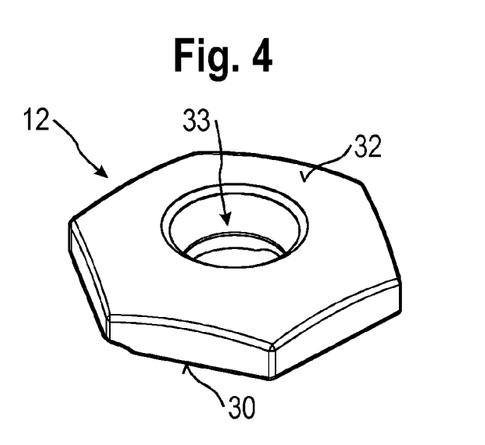

FIGS. 3 and 4 show perspective views of the axial bearing 12 at different angles of observation. The first end face 30 is visible in FIG. 3 with the planar segments and the recess 34 which runs centrally through the axle hole 33. The edges on the first end face 30 are slighted beveled. Liquid can be guided in the recess 34 for instance, which is used to moisten or lubricate the shaft 10 (not shown here).

FIG. 4 shows the side of the axial bearing 12 facing the rotor 7, so that the second end face 32, comprising a curvature, is in particular visible.

Figure 5:
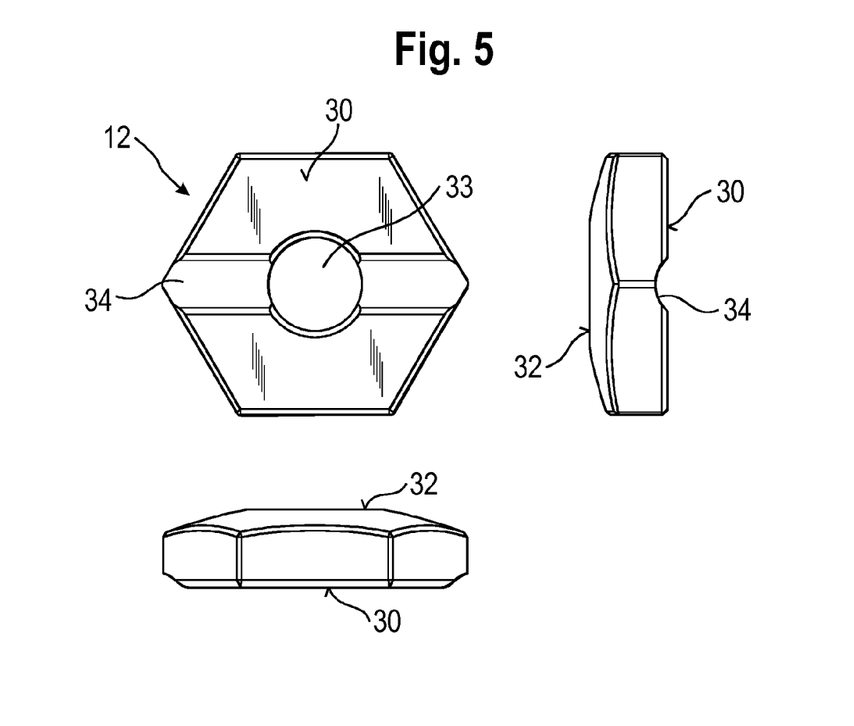

FIG. 5 shows a further representation of the axial bearing 12 in different views. A top view onto the first end face 30 is shown to the top left, in which the hexagonal form of the axial bearing 12 and the design of the recess 34 are visible. The right-hand and lower representation indicate how the first end face 30 runs in a planar fashion, while the second end face 32 comprises a curvature, in particular in the boundary area. The round form of the recess 34 is also visible in the right-hand representation.

Figure 6:
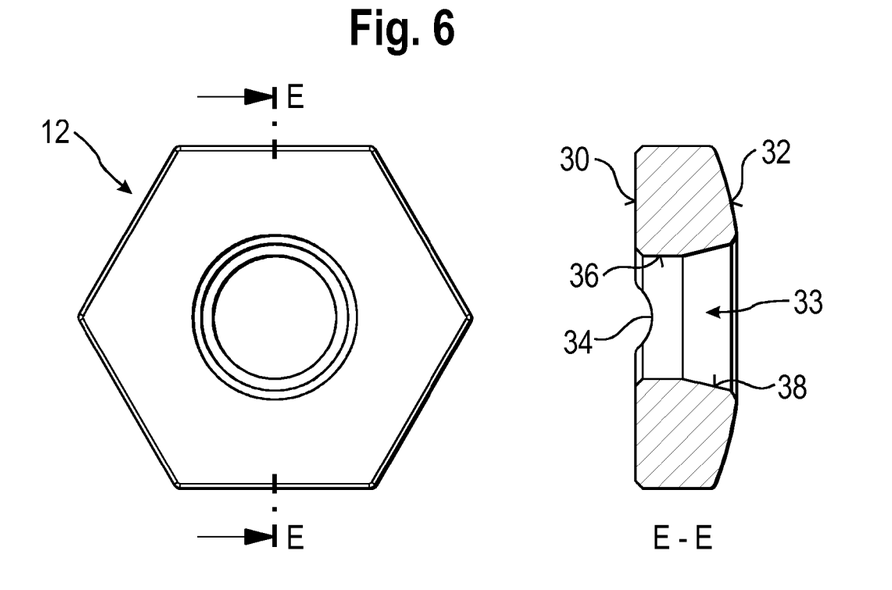
FIG. 6 shows a top view onto the axial bearing according to FIG. 2 and a sectional view at right angles through the axle hole.

FIG. 6 shows a top view onto the side of the axial bearing 12 facing the rotor 7 and a sectional view at right angles through the axle hole. The planar embodiment of the first end face 30 and the curved embodiment of the second end face 32 are herewith visible. Similarly, the round recess 34 can likewise be identified. The axle hole 33 has a first segment 36 and a second segment 38. The first segment 36, which faces the first end face 30, has a constant or essentially constant inner diameter and runs accordingly in a cylindrical manner. The second segment 38, which faces the second, curved end face 32, runs conically, wherein in segment 38 an inner diameter of the axle hole 33 increases towards the second end face 32. In the case of a shaft with a constant outer diameter, an air gap remains there between the axle and the inner wall in the axle hole 33.

Figure 7:
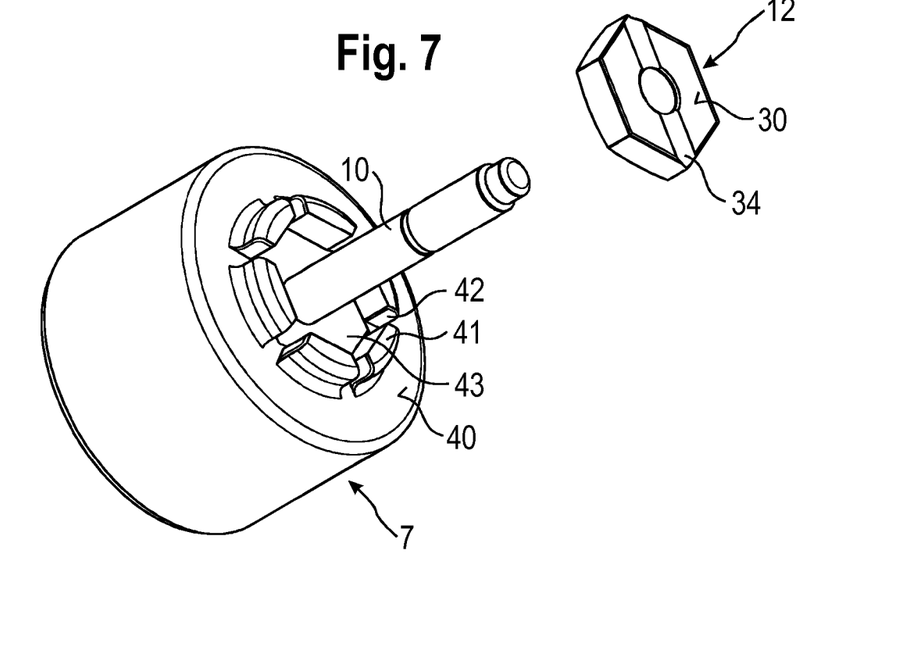
FIG. 7 shows an exploded representation of the rotor according to FIG. 2 with axial bearing.

FIG. 7 shows an exploded representation of the rotor 7. The rotor 7 is mounted on the shaft 10, on which the axial bearing 12 is still placed. The rotor 7 has the bearing seat 40 on one of its end faces, which projects in particular from the end face. The bearing seat 40 is embodied in the form of individual segments 41, which are arranged annularly at a distance between two adjacent segments 41 respectively. The individual segments 41 have a outer contour, which corresponds to an annular segment. Together the segments 41 thus form a receiving ring with notches 42, which include a base surface 43. This means that the outer contour of the bearing seat 40 and/or of the receiving ring formed from the individual segments 41 runs annularly and/or in the manner of a circle. The individual segments 41 comprise a straight inner contour, which runs in each instance along a circular chord of the receiving ring. The inner contour of the bearing seat 40 and/or of the receiving ring formed from the individual segments 41 is thus embodied to be polygonal and in particular adjusted to the multi-sided outer contour of the axial bearing 12.

Figure 8:
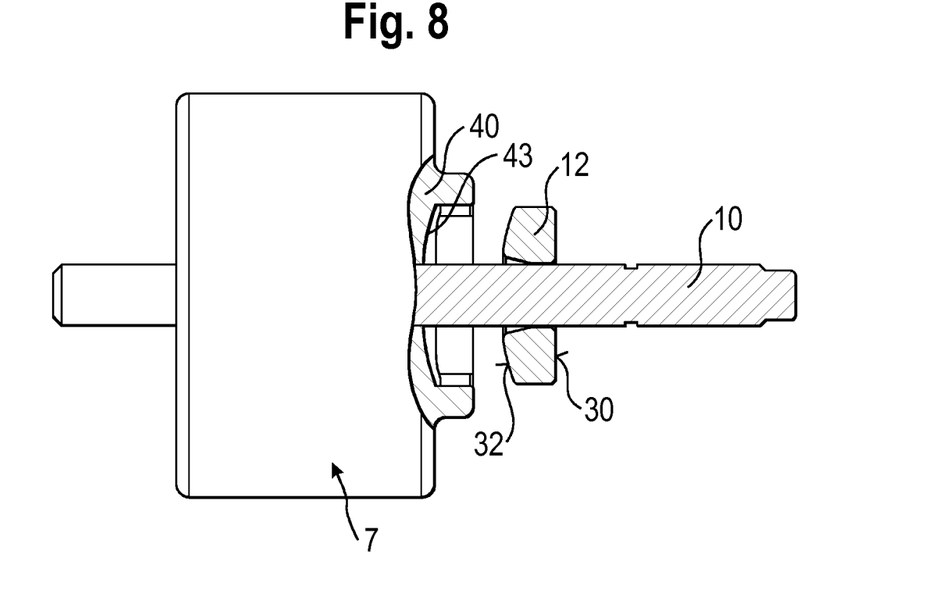
FIG. 8 shows a sectional view of the rotor according to FIG. 7 with axial bearing.

FIG. 8 shows a sectional representation of the rotor 7 with the shaft 10 and the axial bearing 12, which is placed on the shaft 10. It is visible in the sectional view of this representation that the base surface 43 of the bearing seat 40 has a curvature, which corresponds exactly or substantially to the curvature of the second end face 32 of the axial bearing 12. An accurate seating of the axial bearing 12 in the bearing seat 40 is herewith enabled.

Figure 9:
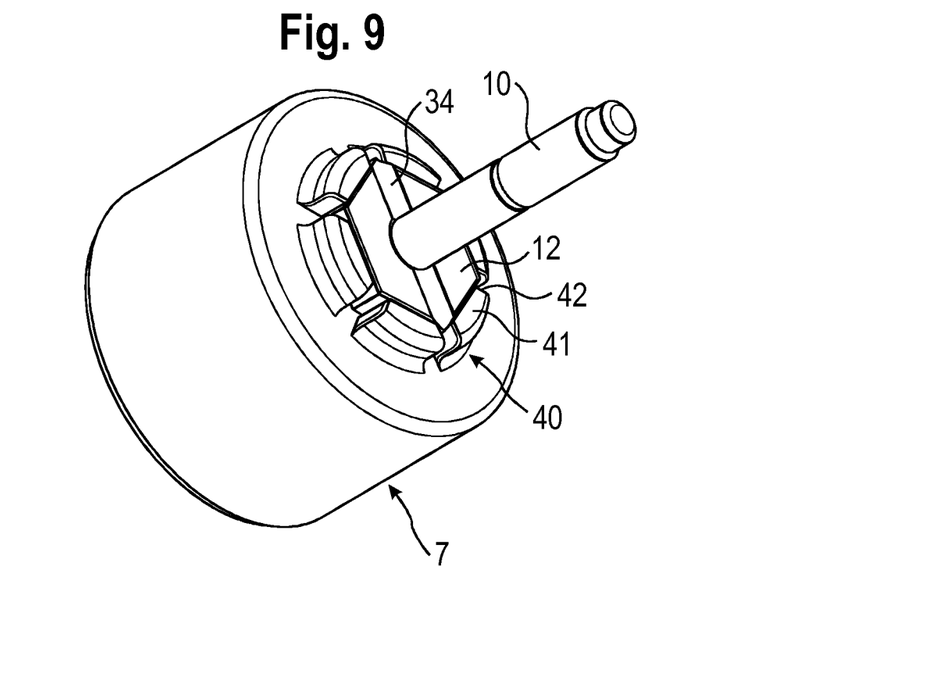
FIG. 9 shows a perspective view of the rotor according to FIG. 7 with axial bearing accommodated in the bearing seat.

In the representation in FIG. 9, the rotor 7 and axial bearing 12 are shown in the assembled state. It is clear here that the axial bearing 12 is held securely and firmly in the bearing seat 40 on account of its special shape. The seating of the axial bearing 12 is not hindered by the notches 42 in the receiving ring. The recess 34 ends in the representation at the edge of the axial bearing 12 in each instance in one of the notches 42, in other words in the gap, which is formed between two adjacent segments 41.

Figure 10:
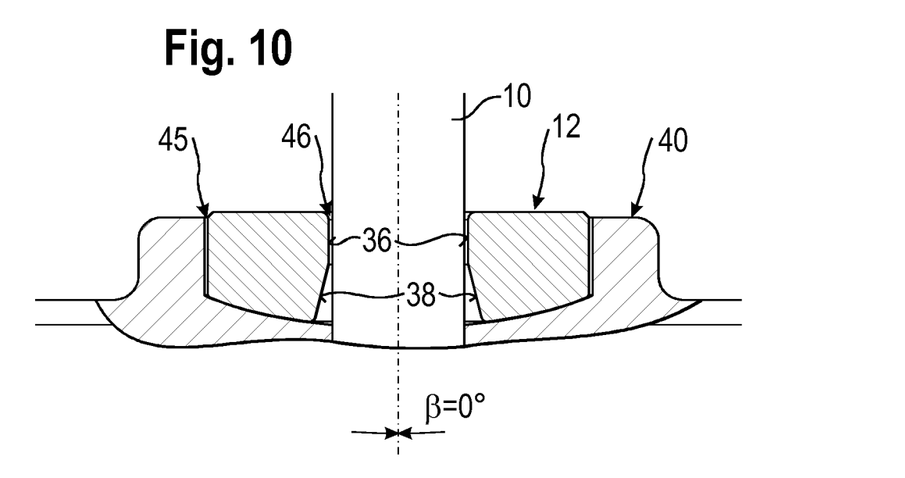
FIG. 10 shows a section through the bearing seat with axial bearing, which is arranged symmetrically in respect of the axle.

FIG. 10 shows a sectional representation of the shaft 10 with the axial bearing 12 mounted in the bearing seat 40. With an ideal alignment of the shaft 10, this runs in complete correspondence with the theoretical axis of rotation of the rotor, thereby producing an angular deviation of $\beta=0°$. A gap 45 between the axial bearing 12 and bearing seat 40 and/or gap 46 between axial bearing 12 and shaft 10 is in this case negligibly low. The shaft 10 rests in the axial bearing 12 only in the cylindrically running first segment 36, while in the second segment 38, none or almost no contact exists between shaft 10 and axial bearing 12.

Figure 11:
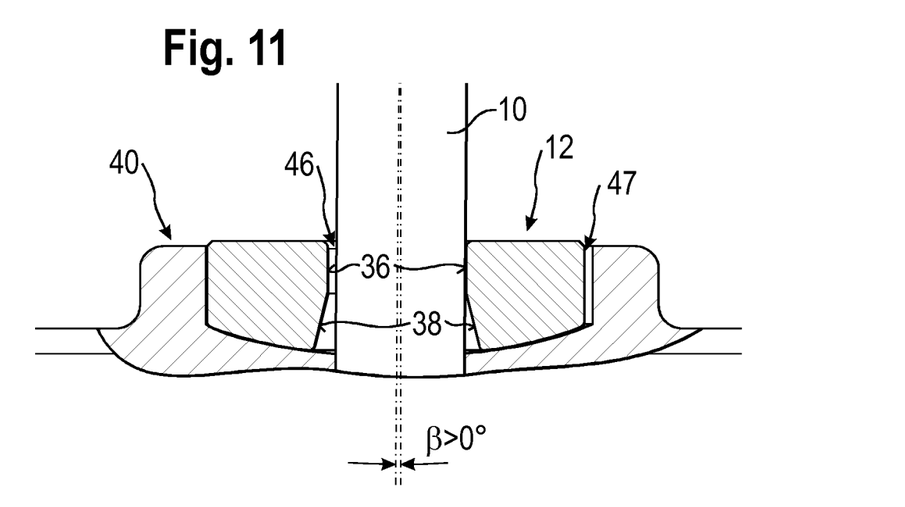
FIG. 11 shows a section through the bearing seat with axial bearing, which is arranged asymmetrically in respect of the axle.

With manufacturing tolerances, it may however result in fewer deviations between the theoretical axis of rotation of the rotor and the shaft alignment, as shown in FIG. 11. An angle of deviation $\beta$ is thus greater than 0° and/or deviates from 0°. This deviation can be balanced out by the axial bearing 12 by a corresponding gap 46 between the axial bearing 12 and shaft 10 and a gap 47 between axial bearing 12 and bearing seat 40. The curvature on the base surface of the bearing seat 40 enables a lateral movement of the axial bearing 12 so that the shaft 10 can also come into contact in the conical area 38 with the axial bearing 12. In particular, the axial bearing 12 during operation of the pump can move in the recess and thus at the same time cause a stable seating of the rotor 7 on the shaft 10 and/or a balancing out of manufacturing inaccuracies. In particular, deviations between fixed and moveable parts of the pump can be balanced out.

In contrast to the afore-cited embodiments, the axial bearing can also comprise a different multi-sided outer contour, for instance in the form of an in particular regular pentagon, hexagon, octagon. A shape of the bearing seat on the rotor is adjusted accordingly in each instance.

With an electric drive, in particular as a pump drive for a pump according to one of the afore-described embodiments, production costs can be reduced in comparison to a conventional drive, because it is possible to dispense with a rubber bush for fixing the axial bearing. Furthermore, the production costs can be reduced for one of the proposed embodiments, because it is possible to dispense with the grinding of a conventional, round axial bearing on its exterior.

When the bearing arrangement is assembled, in particular the axial bearing in the rotor, it is not necessary to expend particular force, since the axial bearing with the multi-sided outer contour can be easily inserted/introduced into the corresponding bearing seat. Since the axial bearing is mounted moveably in the rotor and/or bush, a radial bearing can be arranged in the pump without an additional elastic O-ring.

A pump according to the described embodiments can be used for instance in water-conducting domestic appliances, in particular in a dishwasher or in a washing machine.

An electric drive according to the described embodiments can also be used for instance also other than in pumps, in particular in domestic appliances such as mixers, food processors, grinders or suchlike.

LIST OF REFERENCE CHARACTERS 1 pump
2 housing shell
5 shield
6 electric drive
7 rotor
8,9 sliding bearing
10 axle
12 axial bearing
14, 16 O-ring
18, 19 sliding bearing seat
20 axle seat
22 rotor core
24 magnet
26 casing
28 fan seat
30, 32 end face
33 axle hole
34 recess
36, 38 axle hole segment
40 bearing seat
41 receiving ring
42 notch
43 base surface
45, 46, 47 gap

The invention claimed is:
1. An electric drive for a domestic appliance, comprising:
a rotor;
a shaft;
an axial bearing for retaining the rotor on the shaft, the axial bearing having an axle hole, a multi-sided outer contour and an end face having a recess running centrally through the axle hole;
the rotor including a bearing seat having a multi-sided inner contour corresponding to the multi-sided outer contour, the bearing seat having lateral notches;
said recess ending at opposite ones of said lateral notches on opposite sides of said end face.

2. The electric drive as claimed in claim 1, wherein the bearing seat has an outer contour in the shape of a circle.

3. The electric drive as claimed in claim 1, wherein the bearing seat is embodied in the form of individual segments, which are arranged annularly with a distance between two adjacent segments in each instance.

4. The electric drive as claimed in claim 1, wherein a base surface of the bearing seat has a curved segment.

5. The electric drive as claimed in claim 1, wherein the axial bearing is arranged with play in the bearing seat.

* * * * *